United States Patent [19]
Cairns

[11] Patent Number: 6,056,343
[45] Date of Patent: May 2, 2000

[54] MOTORCYCLE GAS TANK HANGER DEVICE

[76] Inventor: Ronald W. Cairns, 83 Madrid Pl., Freemont, Calif. 94539

[21] Appl. No.: 09/250,755

[22] Filed: Feb. 16, 1999

[51] Int. Cl.[7] ........................................................ A47F 7/00
[52] U.S. Cl. ............................ 294/159; 294/27.1; 248/175
[58] Field of Search ................................... 294/159, 27.1, 294/15, 158, 137; 248/121, 175, 153; 211/205, 196, 37, 33

[56] References Cited

U.S. PATENT DOCUMENTS

| | | | |
|---|---|---|---|
| 2,905,502 | 9/1959 | Brown | 294/159 |
| 3,779,392 | 12/1973 | Betts, Sr. | 248/220.43 |
| 3,944,924 | 3/1976 | Miyachi | 455/575 |
| 4,485,929 | 12/1984 | Betts, Sr. | 211/74 |
| 5,501,736 | 3/1996 | Statz et al. | 118/500 |
| 5,588,216 | 12/1996 | Rank et al. | 33/286 |

*Primary Examiner*—Dean J. Kramer
*Assistant Examiner*—Paul T. Chin
*Attorney, Agent, or Firm*—Cherskov & Flaynik

[57] ABSTRACT

A motorcycle gas tank hanger device 10 includes a base 12, gas tank support member 14, handle 16 and hanger 18 to allow one or more gas tanks 20 to be positioned above a horizontal, planar surface or carried and vertically hung from the hanger 18 thereby positioning the gas tanks 20 in such a way that painted surfaces on the gas tanks 20 are prevented from engaging another object that could scratch or otherwise damage the painted surfaces.

19 Claims, 6 Drawing Sheets

MOTORCYCLE GAS TANK HANGER DEVICE

BACKGROUND OF THE INVENTION

1. Field of the Invention

The present invention relates to a motorcycle gas tank hanger and support device and more particularly, to a device, that is capable of removably receiving and supporting one or more motor gasoline tanks having painted surfaces in such a way that the gasoline tanks are prevented from engaging other objects that would scratch or otherwise damage the painted surfaces.

2. Background of the Prior Art

Maintenance performed on a motorcycle often requires the removal of the gas tanks to work on the engine or adjacent engine accessories. Often, the motorcycle gas tanks surfaces have expensive, detailed paintings of figures or other artistic expressions. These painted surfaces are easily scratched and damaged it set upon the ordinary work shop bench for temporary storage.

One method utilized to prevent the scratching of the painted surfaces is to use a wire inserted through an orifice in a mounting bracket integrally secured to the gasoline tanks, and wrapping the other end of the wire around an object to thereby support the gas tanks vertically and avoid contact between the painted surfaces and other objects.

The problem with the above described tank support method is that the tanks can "swing" and bump into adjacent structures causing the scratching of the painted surfaces.

Therefore, a motorcycle gasoline tank hanger device is required that is capable of supporting one or more motorcycle gasoline tanks in a horizontal or vertical position, and be capable of preventing engagement between the painted surfaces of the gas tanks and adjacent objects and/or the device as well.

SUMMARY OF THE INVENTION

It is an object of the present invention to overcome many of the disadvantages associated with motorcycle gas tank storage devices.

A principle object of the present invention is to provide a device that avoids damage to painted surfaces of motorcycle gas tanks. A feature of the device is a base relatively larger in perimeter, when taking a top view of the device, than the perimeter of the gasoline tanks secured to the device. An advantage of the device is that the base can engage a vertical support member to allow the device to hang 10vertically.

Another object of the present invention is to hold the gasoline tanks as they would mount to a motorcycle frame. A feature of the device is oppositely positioned gas tanks connected to the device. An advantage of the device is the decreased chance of scratching the painted surface of the gasoline tanks.

Yet another object of the present invention is to provide a work station upon which the gasoline tanks may be secured. A feature of the device is the unobstructed access to the tanks when secured to the device. An advantage of the device is that the tanks can be painted or displayed while secured to the device.

Still another object of the present invention is the safe transportation of the gas tanks while secured to the device. A feature of the device is a handle and lightweight components. An advantage of the device is that the device, with gasoline tanks attached thereto, may be picked up and carried by an individual.

Another object of the present invention is the engagement of only one component of the device with the gasoline tank. A feature of the device is an arcuate mounting stud on an upper portion of the device that causes the painted surfaces of the gasoline tanks to be positioned distally from the device. An advantage of the device is that the painted surface of the gasoline tank will not be scratched when the tanks are secured to the device.

Still another object of the invention is to minimize support and engagement components between the device and the gasoline tanks. A feature of the device is the location of support studs that correspond to the position of mounting studs on a motorcycle frame. An advantage of the device is the prevention of stud scratches upon the surface of the gasoline tanks.

Briefly, the invention provides a motorcycle gas tank hanger comprising a handle; a base; a tank support member having means for removably receiving oppositely positioned motorcycle gas tanks; means for removably securing said device in a position whereby the motorcycle gas tanks are physically isolated to prevent the gas tanks from engaging another object; and means for securing said motorcycle gas tanks to said support member.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DETAILED DESCRIPTION OF THE PREFERRED EMBODIMENT

Figure 1:
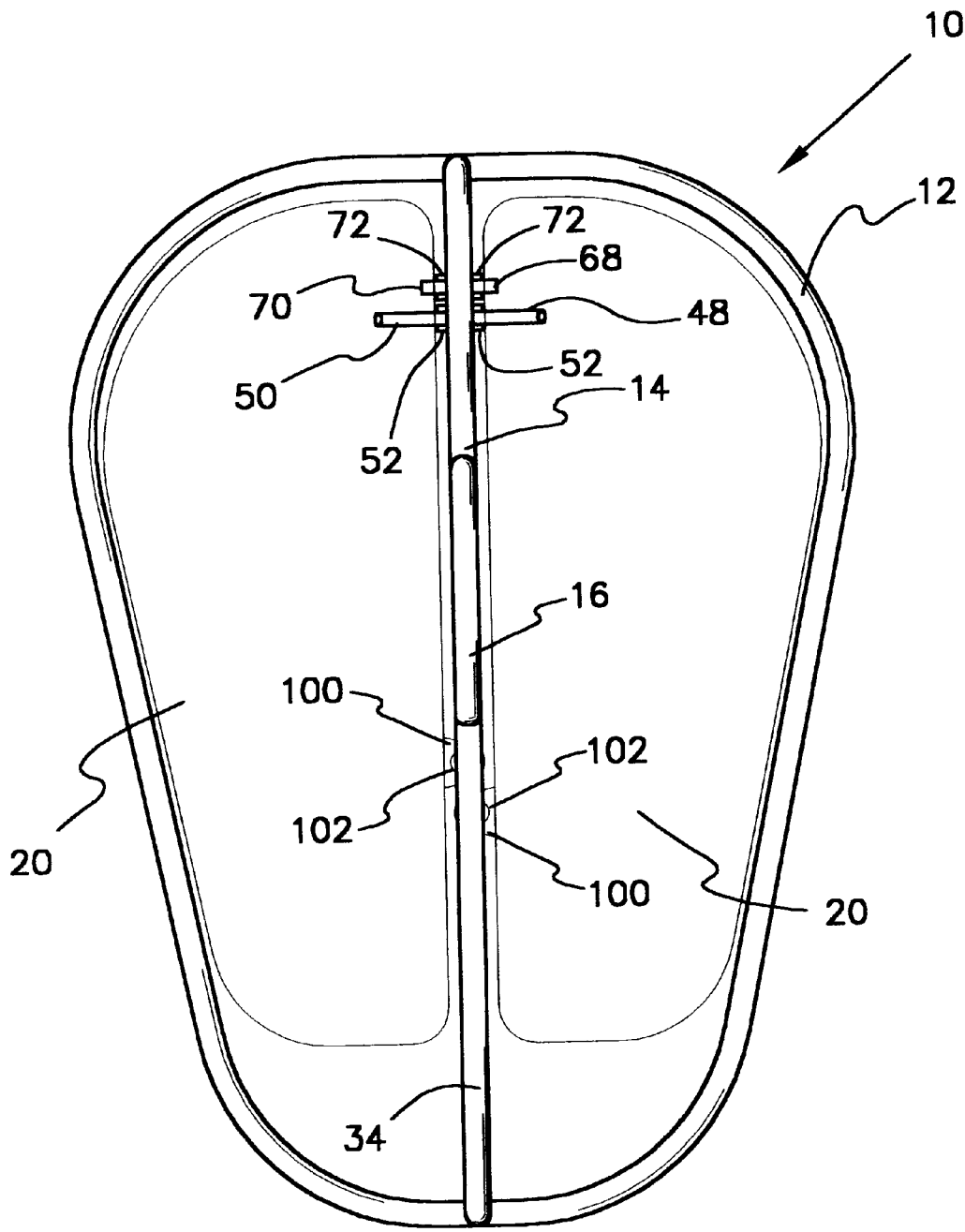
FIG. 1 is a top elevation view of a motorcycle gas tank hanger device with two oppositely connected gas tanks attached thereto in accordance with the present invention.
Figure 2:
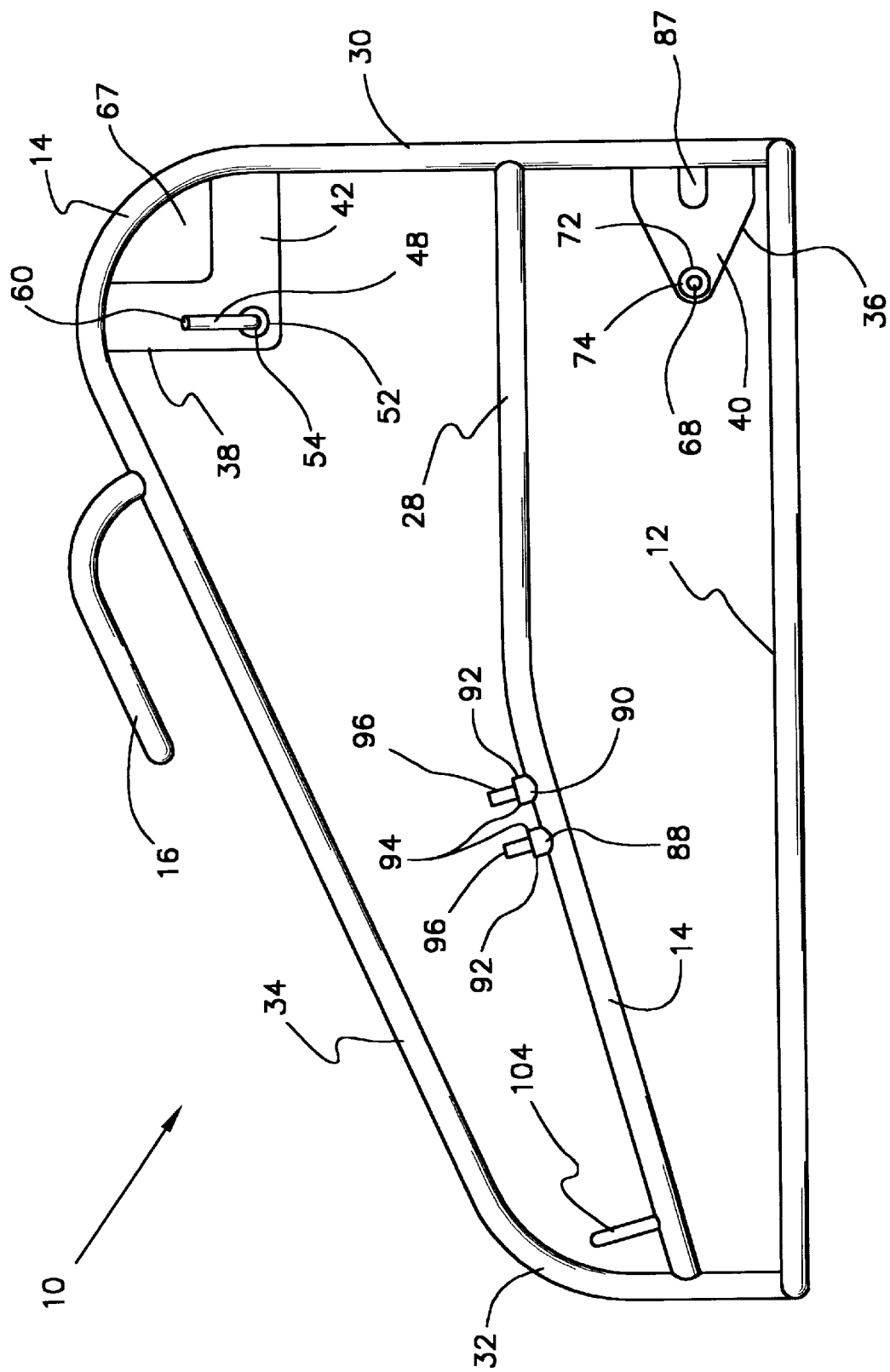
FIG. 2 is a side elevation view of the device in accordance with the present invention.

Referring now to the figures an in particular to FIGS. 1 and 2, a motorcycle gas tank hanger device is denoted by numeral 10. The device 10 includes a base member 12, a tank support member 14, a handle 16 and a hanger member 18. The device is preconfigured and sized to removably receive one or more preselected motorcycle gas tanks that have been removed from a motorcycle. The removed gas tanks have exposed external surfaces that usually have expensive paint designs or figures detailed thereon; and preventing contact between these painted surfaces and any and all objects is of utmost concern to the motorcycle owner.

The device 10 is generally fabricated from carbon steel bar stock although substitute materials such as aluminum and plastic can be utilized. Further, a channel or tubular configuration can be substituted for the solid bar stock as long as weight limitations of the channel or tube are not exceeded.

Figure 3:
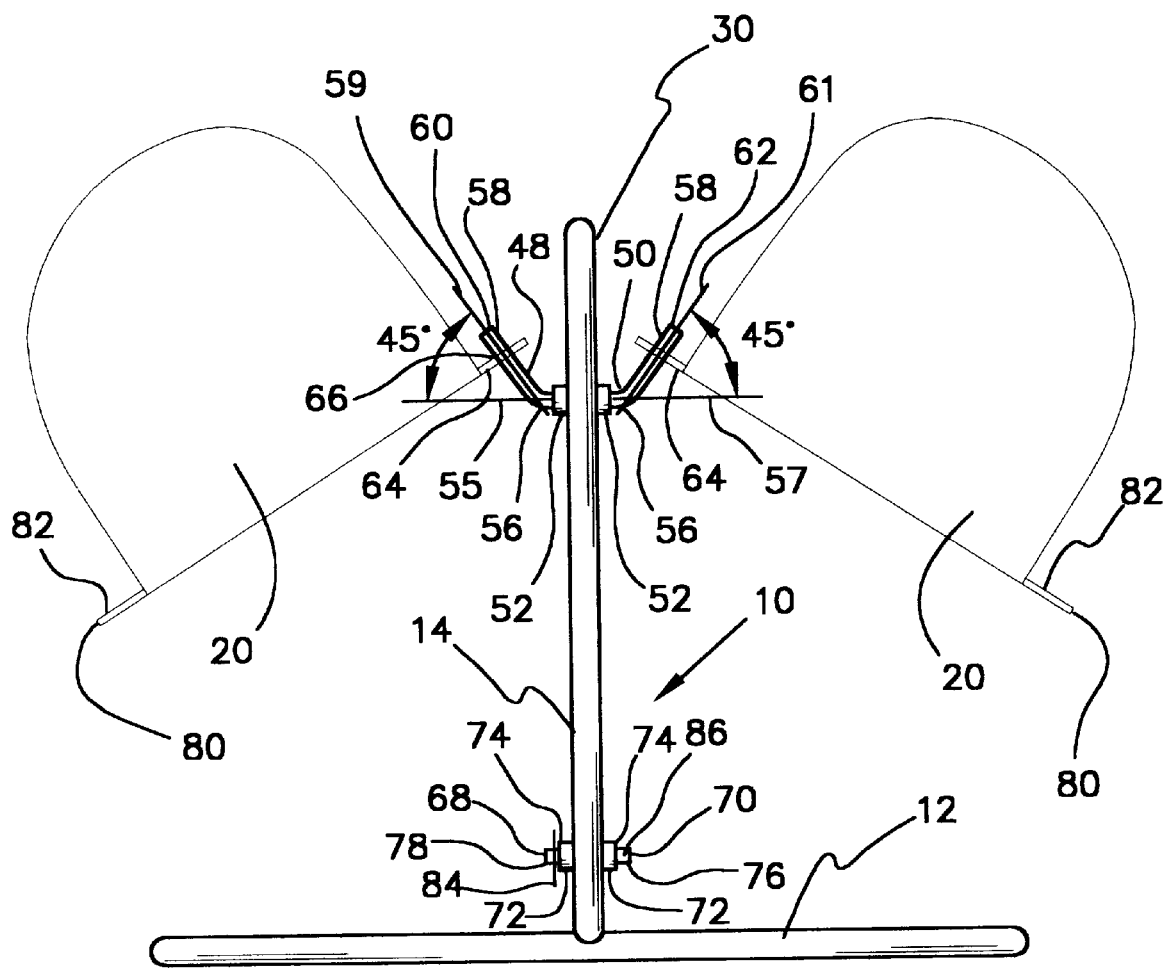
FIG. 3 is a front elevation view of the device with two oppositely positioned gas tanks engaging an arcuate stud in accordance with the present invention.
Figure 4:
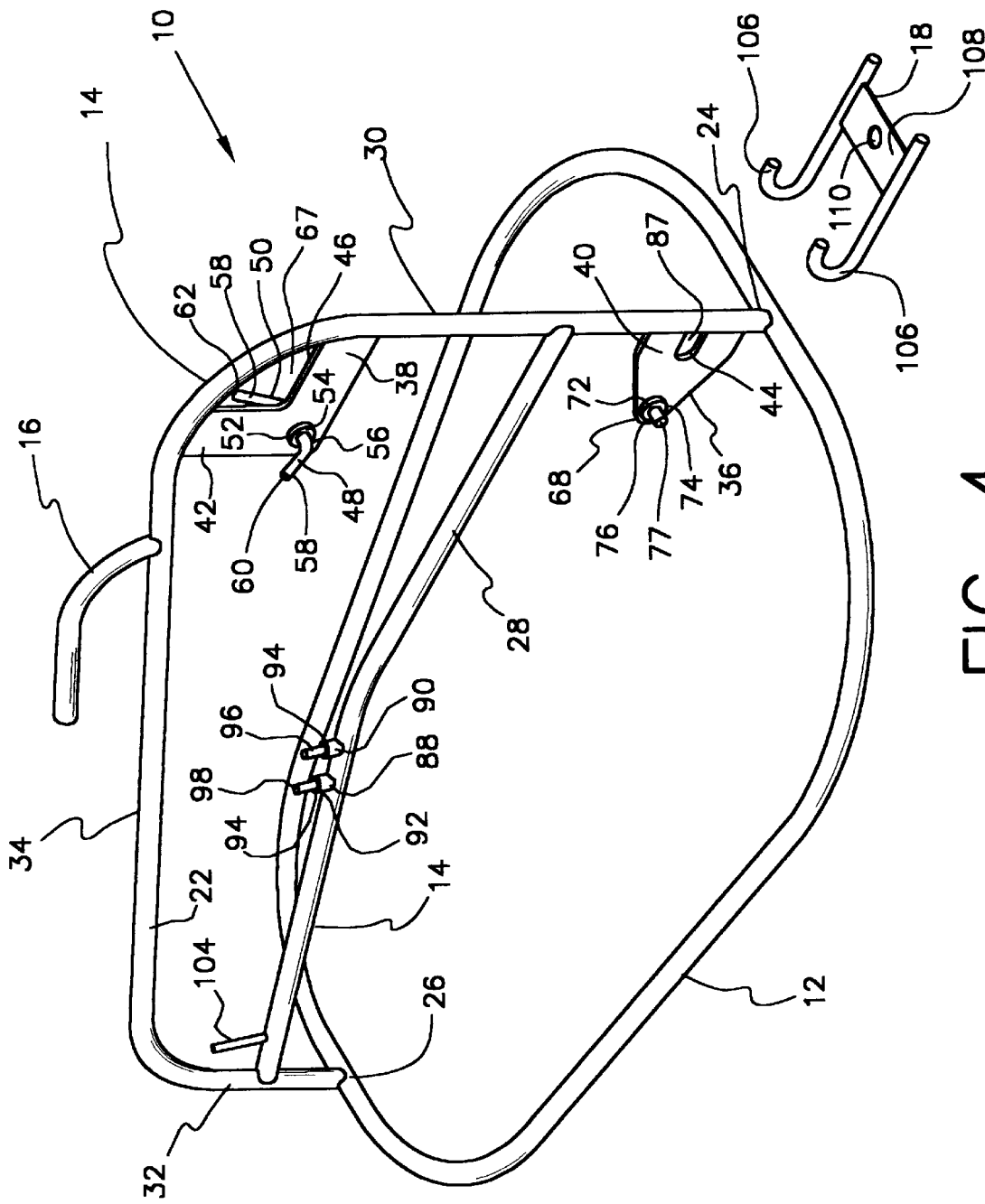
FIG. 4 is a perspective view of the device in accordance with the present invention.

Referring to FIGS. 1 and 4, the base 12 is formed, when taking a top elevation view, into a relatively trapezoidal configuration to correspond to the top exterior configuration of two motorcycle gas tanks (shown on FIGS. 1 and 3 as reference number 20, but not to be included as part of the invention) oppositely secured to the support member 14. The base 12 ultimately engages a flat surface that the device 10 sets upon. The base 10 perimeter must be relatively larger than the perimeter of two oppositely attached gas tanks 20 to provide sufficient stability to the device 10 such that when setting the device 10 with gas tanks attached thereto upon a planar surface, the device 10 will not tip or "rollover" thereby damaging the painted surfaces of the gas tanks.

The tank support member 14 includes a solid "unibody" relatively 'u' shaped or arcuately configured upper portion 22 integrally joined to the base 12, via welding or other securing means known to one of ordinary skill in the art, at front and back portions 24 and 26; and a lower portion 28 integrally joined to vertical and rear members 30 and 32 of the upper portion 22. The handle 16 is integrally joined to an angle section 34 of the upper portion 22 to enable the device 10 to be lifted and transported by an individual to a safe storage or display area thereby preventing damage to painted surfaces of motorcycle gas tanks 20 removably secured to the device 10.

The handle 16, upper portion 22 and lower portion 28 are aligned when taking top and front elevation views (FIG. 3) of the device 10, and lie in a plane substantially perpendicular to the plane of the base 12. The lower portion 28 is positioned a distance from the base 12 sufficient to integrally join a lower support stud member or plate 36 to the vertical section 30, between the base 12 and the lower portion 28 of the tank support member 14. The upper portion 22 is positioned a distance from the lower portion 28 sufficient to integrally join an arcuate stud support member or plate 38 to the vertical section 30, between the lower and upper portions 28 and 22 of the support member 14. The lower and arcuate stud plates 36 and 38 are fabricated from a relatively "thin" piece of metal plate having planar surfaces on either side. The lower and arcuate stud plates 36 and 38 are orientated such that a planar first wall 40 of the lower stud plate 36 is coplanar with a planar first wall 42 of the arcuate stud plate 38; and a planar second wall 44 of the lower stud plate 36 is coplanar with a planar second wall 46 of the arcuate stud plate 38.

Referring to FIGS. 2, 3 and 4, the arcuate stud plate 38 includes first and second arcuate studs 48 and 50 extending from respective first and second planar walls 42 and 46. The arcuate studs 48 and 50 are integrally joined to the stud plate 38 via welding or other comparable methods. The arcuate studs 48 and 50 include cylindrical tank stopping portions 52 having planar, annular top walls 54 parallel to the planar walls 42 and 46 of the arcuate stud support plate 38. The arcuate studs 48 and 50 further include cylindrical first portions 56 having aligned longitudinal axes 55 and 57 perpendicular to the planar topwalls 54 of the stopping portion 52, and angled, cylindrically configured second portions 58 having longitudinal axes 59 and 61 intersecting the longitudinal aligned axes 55 and 57 of the first portion 56 such that an acute angle is formed between the first and second portions 56 and 58. The longitudinal axes of the first and second portions 56 and 58 lie in a vertical plane that is perpendicular to the side walls 42 and 46 of the arcuate stud support plate 38. The acute angles formed from the first and second portions 56 and 58 of the first and second arcuate studs 48 and 50, are approximately forty-five degrees although plus or minus variations in degrees would be acceptable for the device 10 to operate efficiently.

Referring to FIGS. 2 and 3, the longitudinal axes 59 and 61 of the second portions 58 of the arcuate studs 48 and 50, are orientated to diverge vertically away from the device 10 thereby positioning respective tank receiving ends 60 and 62 so as to prevent engagement between the motorcycle gas tank and the device 10. The tank receiving ends 60 and 62 ultimately receive tank mounting brackets 64 via apertures 66 and is the only contact that initially occurs between the device 10 and the motorcycle gas tanks 20. A viewing aperture 67 is provided in the arcuate stud plate 38 to aid in guiding the gas tank bracket apertures 66 onto the first and second arcuate studs 48 and 50. Thus, painted surfaces or other artwork on the gasoline tank surfaces are prevented from engaging any part of the device 10.

The lower support stud plate 36 includes first and second lower studs 68 and 70 extending from respective first and second planar walls 40 and 44. The lower studs 68 and 70 are integrally joined to the lower support stud plate 36 via welding or other comparable methods. The lower studs 68 and 70 include cylindrical tank stopping portions 72 having planar, annular top walls 74 parallel to the planar walls 40 and 44 of the lower stud support 36. The lower studs 68 and 70 further include cylindrical horizontal portions 76 having aligned longitudinal axes perpendicular to the planar top walls 74 of the stopping portions 72. The horizontal portions 76 include tank receiving ends 78 that receive tank mounting brackets 80 via apertures 82 to secure the motorcycle gas tank 20 when the tanks 20 are positioned on the arcuate mounting studs 48 and 50, slid onto the first portions 56 of the studs 48 and 50, then positioned upon the lower studs 68 and 70 and ultimately secured in place via cotter pins 84 inserted through pin receiving orifices 86 laterally positioned through the lower studs 68 and 70. Similarly to the arcuate mounting plate 38, a viewing aperture 87 is provided in the lower stud plate 36 to aid in guiding the gas tank bracket apertures 82 onto the first and second lower studs 68 and 70 thereby avoiding scratching or otherwise damaging the painted surfaces of the motorcycle gas tanks 20.

Although the tanks 20 would be relatively stable connected to only the arcuate and lower mounting studs detailed above, to increase the stability of the tanks 20 engaging the device 10, a third set of mounting studs are incorporated into the device 10. The lower portion 28 of the support member 14 includes first and second end studs 88 and 90 extending vertically from the lower portion 28. The end studs 88 and 90 are integrally joined to the lower portion 28 via welding or other comparable methods. The end studs 88 and 90 include cylindrical tank stopping portions 92 having planar, annular top walls 94. The end studs 88 and 90 further include cylindrical vertical portions 96 having parallel, longitudinal, vertical axes, perpendicular to the cylindrical surface of the lower portion 28. The vertical portions 96 include tank receiving ends 98 that receive tank mounting brackets 100 via apertures 102 to secure the motorcycle gas tanks 20 when the tanks 20 are positioned on the arcuate mounting studs 48 and 50, slid onto the first portions 56 of the studs 48 and 50, positioned upon the lower studs 68 and 70, and the end studs 88 and 90, then locked in place via cotter pins 84 inserted through orifices 86.

The lower portion 28 further includes a holding stud 104 that receives mounting washers and other motorcycle tank mounting components having apertures therethrough. The tank mounting components are placed upon the holding stud 104 to prevent the components from being lost or thrown away. The holding stud 104 is cylindrically configured and extends vertically from the lower portion 28 such that the longitudinal axis of the holding stud 104 is perpendicular to the cylindrical surface of the lower portion 28.

The hanger member 18 includes a pair of hooks 106 fabricated from metal bar stocks, and integrally joined together by a flat metal bar 108 with an aperture 110 therethrough to receive a mounting screw to ultimately secure the hanger member 18 to a vertical structure such that the hooks 106 are capable of receiving and holding a portion of the base member 12 of the device 10. The hanger member 18 must be mounted to vertically hold the device 10 with two motorcycle gas tanks secured thereto.

In operation, the device 10 is sized to receive two motorcycle gas tanks 20. The perimeter of the base 12 will be greater than the perimeter of the tanks 20 when taking a top elevation view of the device 10 with the tanks attached thereto. The tank support member 14 will extend perpendicularly from the base member 12, a distance greater than the perimeter of the motorcycle gas tanks when taking a side elevation view of the device with the tanks 20 attached. The device 10 is then positioned upon a planar relatively horizontal surface. One or two motorcycle gas tanks 20 are then positioned such that arcuate stud apertures 66 receive first and second arcuate studs 48 and 50. The tanks 20 are rotated from the forty-five degree angle illustrated in FIG. 3, and lowered into the same positions that the tanks 20 occupied when installed on a motorcycle frame. The rotation and lowering of the tanks 20 allows lower and end receiving apertures 82 and 102 in the tanks 20 mounting brackets 80 and 100, to receive corresponding first and second lower studs 60 and 70, and first and second end mounting studs 88 and 90. The tank brackets 64, 80, and 100 ultimately engage corresponding tank stopping portions 52, 72, and 92 of the mounting studs to secure the positions of the tanks 20 until cotter pins 84 are inserted through orifices 86 in the first and second lower studs 68 and 70 thereby attaching the tanks 20 to the device 10 for vertical or horizontal storage.

Figure 5:
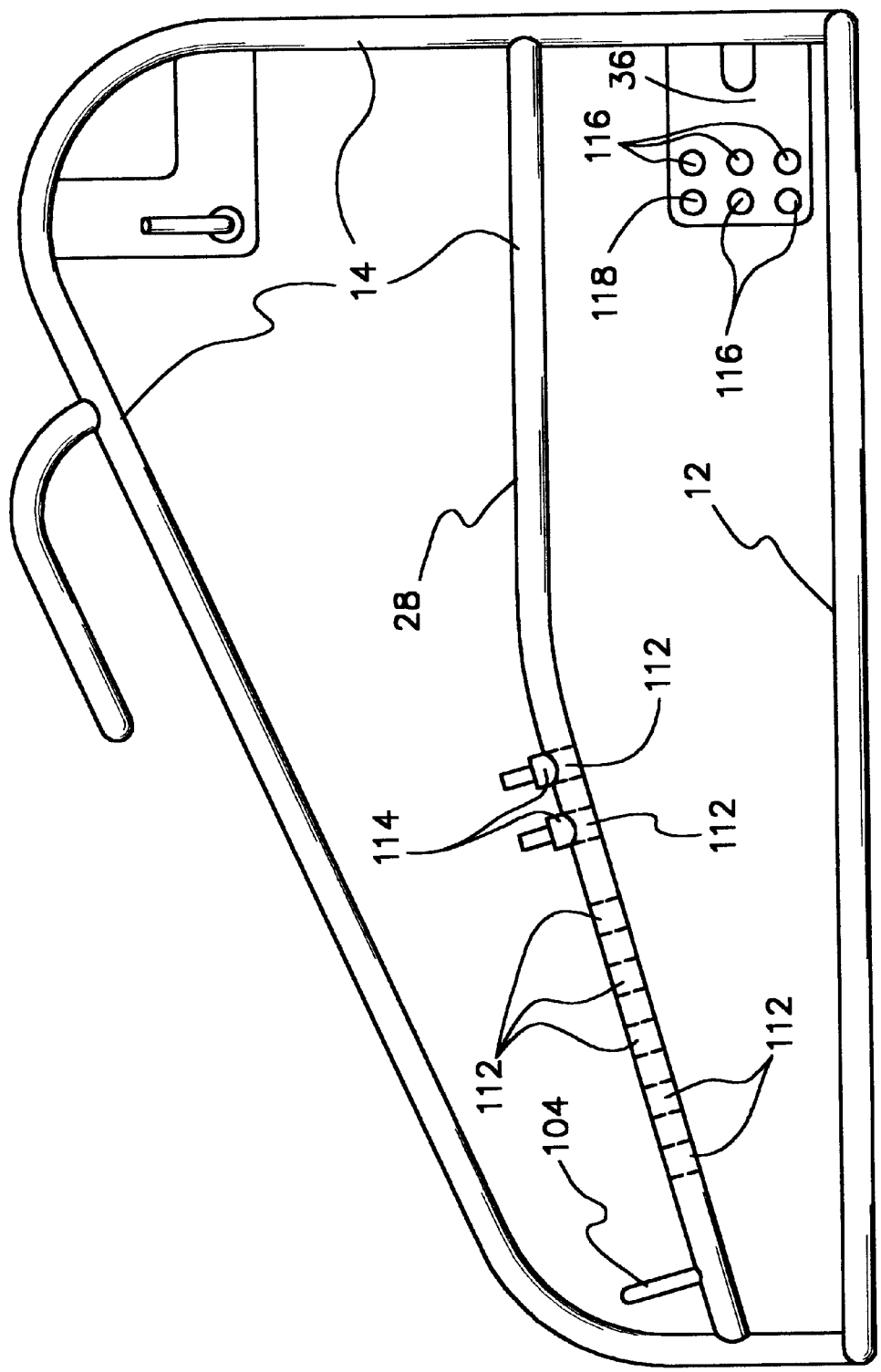
FIG. 5 is a side elevation view of an alternative embodiment of the device in accordance with the present invention

Referring now to FIG. 5, an alternative embodiment of the invention is illustrated. Threaded end orifices 112 are aligned longitudinally and perpendicularly in the tipper surface of the lower portion 28 of the tank support member 14. These orifices 112 removably receive threaded end studs 114 positioned to receive the apertures in the brackets joined to the end portions of preselected motorcycle gas tanks ultimately secured to the device 10. Also, threaded lower orifices 116 and lower studs 118 are required in the lower plate 36. The positioning of the threaded end and loser studs 114 and 118 in threaded end and lower orifices 112 and 116 corresponds to the location of apertures in the brackets joined to the preselected gas tanks. Multiple end and lower orifices 112 and 116 allow for varying sizes of motorcycle gas tanks to be secured to the device 10.

Figure 6:
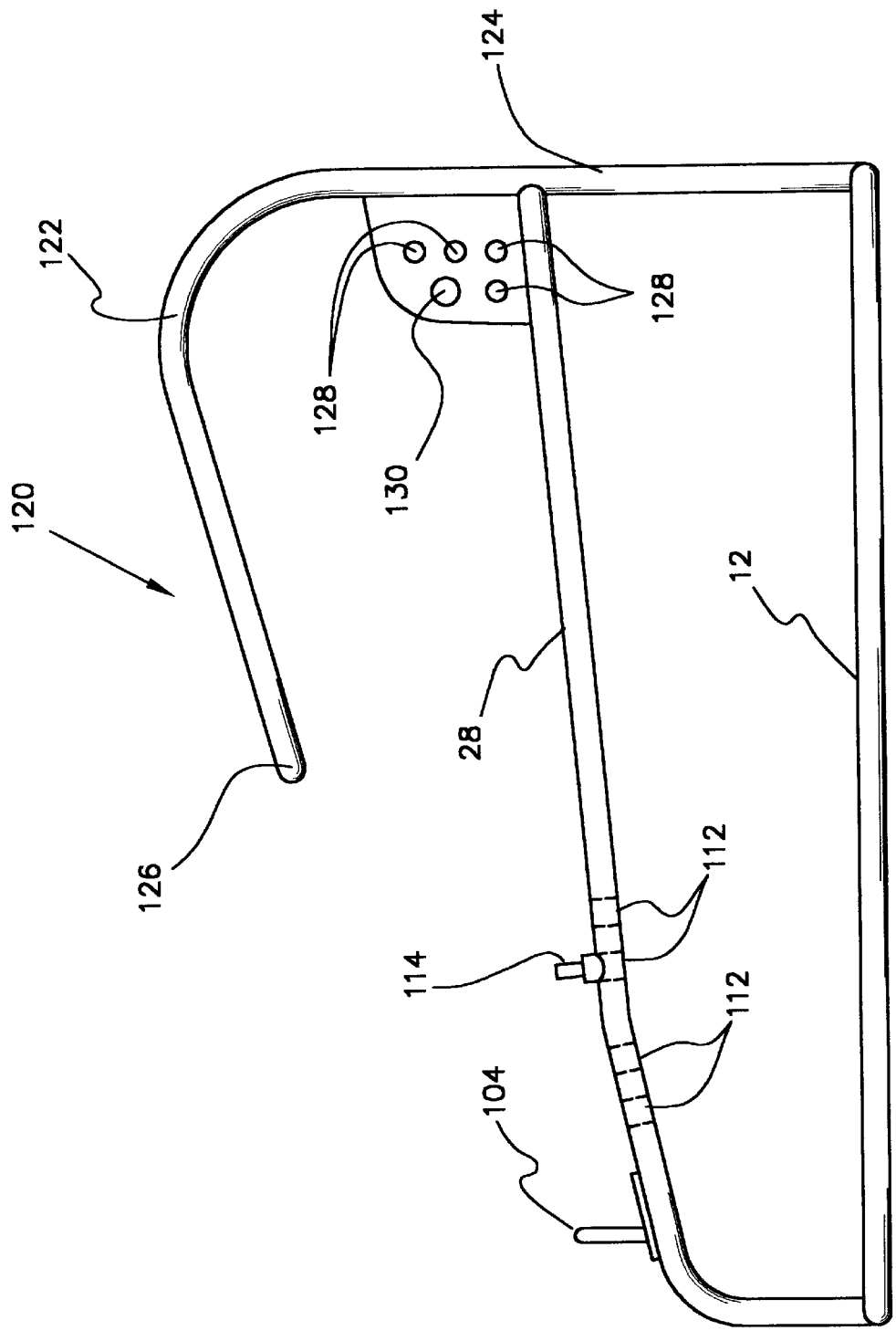
FIG. 6 is a side elevation view of another alternative embodiment of the device in accordance with the present invention.

Referring now to FIG. 6, another alternative embodiment of the invention is illustrated. A motorcycle gas tank hanger device 120 for only one gas tank is depicted. The device 120 includes substantially the same base 12 and lower portion 28 configuration. However, the handle 16 and angle section 34 have been replaced by a handle 122 integrally joined to a vertical section 124. An end portion 126 of the handle 122 is vertically separated from the lower portion 28 a distance sufficient to allow a motorcycle gas tank to insert between the handle 122 and lower portion 28. The gas tank is positioned such that a front orifice in a tank bracket is aligned with a front orifice 128 in the device 120 to ultimately receive a securing bolt 130, therethrough; and a back orifice in a tank bracket is aligned with a threaded end orifice 112 in the lower portion 28 to ultimately receive a threaded end stud 114. The securing bolt 130 and end stud 114 secure the gas tank to the device 120 thereby allowing the device 120 to be hung by the base 12 from the hanger 18 to prevent a painted surface on the gas tank from engaging other objects that would damage the painted surface.

What is claimed and desired to be secured by Letters Patent of the United States is:

1. A motorcycle gas tank hanger device comprising:
    a handle;
    a base;
    a tank support member having means for removably receiving oppositely positioned motorcycle gas tanks;
    means for removably securing said device in a position whereby the motorcycle gas tanks are physically isolated to prevent the gas tanks from engaging another object; and
    means for securing the motorcycle gas tanks to said support member.

2. The device of claim 1 wherein said motorcycle gas tank receiving means includes means for positioning said motorcycle gas tanks at a predetermined angular position to thereby prevent engagement between a painted surface on said gas tanks and retaining studs integrally joined to said support member.

3. The device of claim 2 wherein said positioning means includes an arcuately configured stud that receives said motorcycle gas tanks.

4. The device of claim 3 wherein said arcuately configured stud includes a first portion integrally joined to an arcuate stud support member, said first portion having a longitudinal axis perpendicular to said arcuate stud support member, said arcuate stud support member being integrally secured to said tank support member; and a second portion having a longitudinal axis intersecting said longitudinal axis of said first portion to form an acute angle between said axes of said first and second portions thereby positioning said motorcycle gas tank such that an upper aperture of said motorcycle gas tank engages said arcuate stud, and said painted surface of said motorcycle gas tanks are spacially separated from the device.

5. The device of claim 4 wherein said arcuate stud support member includes a viewing aperture therethrough.

6. The device of claim 5 wherein said second portion of said arcuately configured stud extends longitudinally a distance such that a tank receiving end of said arcuately configured stud is separated from the planar surface of said arcuate stud support member a perpendicular distance greater than the perpendicular separation between said tank receiving end of said lower support stud, and the planar surface of said lower support stud member.

7. The device of claim 1 wherein said means for securing said motorcycle gas tanks to said support member includes a lower support stud integrally secured to a lower support stud member that is integrally joined to said tank support member; and an end support stud integrally secured to a lower portion of said tank support member.

8. The device of claim 1 wherein said device securing means includes means for attaching said base of said device to an elevated support structure.

9. The device of claim 8 wherein said attaching means includes a pair of hooks spacially separated and integrally joined to a means for securing said hooks to said elevated support structure such that said hooks removably receive said base of said device thereby elevating said motorcycle gas tanks and preventing engagement between painted surfaces of said motorcycle gas tanks and another object.

10. The device of claim 1 wherein said motorcycle gas tank securing means includes means for fastening said motorcycle gas tanks to said device with only one fastening pin.

11. A motorcycle gas tank support device comprising:

means for removably receiving a preselected motorcycle gas tank on said support device;

means for positioning the motorcycle gas tank so as to provide initial engagement between an aperture in a support bracket joined to the gas tank, and a tank support member of said device;

means for securing the motorcycle gas tank to said device while said tank support member of said device engages said aperture in the support bracket for the motorcycle gas tank; and means for preventing engagement between a painted surface on the motorcycle gas tank and another object.

12. The device of claim 11 wherein said receiving means includes lower and end support studs having a predetermined orientation that corresponds to apertures in support bracket joined to the preselected motorcycle gas tank.

13. The device of claim 11 wherein said positioning means includes an arucately configured support stud integrally joined to a vertical section of said device, said arcuate support stud being orientated such that the longitudinal axis of a second portion of said arcuate support stud vertically diverges from said device.

14. The device of claim 13 wherein said arcuate support stud is orientated such that a longitudinal axis of a first portion of said arcuate support stud is positioned horizontally.

15. The device of claim 13 wherein said arcuate support stud includes a receiving end separated from a vertical section of said device a horizontal perpendicular distance greater than the horizontal perpendicular distance separating said vertical section and tank receiving ends of said lower support stud.

16. The device of claim 11 wherein said securing means includes configuring said arcuate support stud to include a first portion integrally joined to a stud support member, said first portion having a longitudinal axis perpendicular to said stud support member, said stud support member being integrally secured to a vertical section of said device; and a second portion having a longitudinal axis intersecting said longitudinal axis of said first portion to form an acute angle between said axes of said first and second portions of said arcuate support stud.

17. The device of claim 11 wherein said engagement prevention means includes means for spacially separating said motorcycle gas tanks from said tank support member and a base member of said device.

18. The device of claim 11 wherein said engagement prevention means includes a base member having a perimeter, when taking a top elevation view of said device, relatively larger than the perimeter of the motorcycle gas tank secured to said device.

19. A motorcycle gas tank carrying device comprising:

a handle;

a base;

a tank support member;

means for separating said support member from a painted surface on the motorcycle gas tank;

means for engaging said tank support member with the motorcycle gas tank at a first receiving means; and means for attaching the motorcycle gas tank to said tank support member while the motorcycle gas tank engages said first receiving means.

* * * * *